Figure 1:
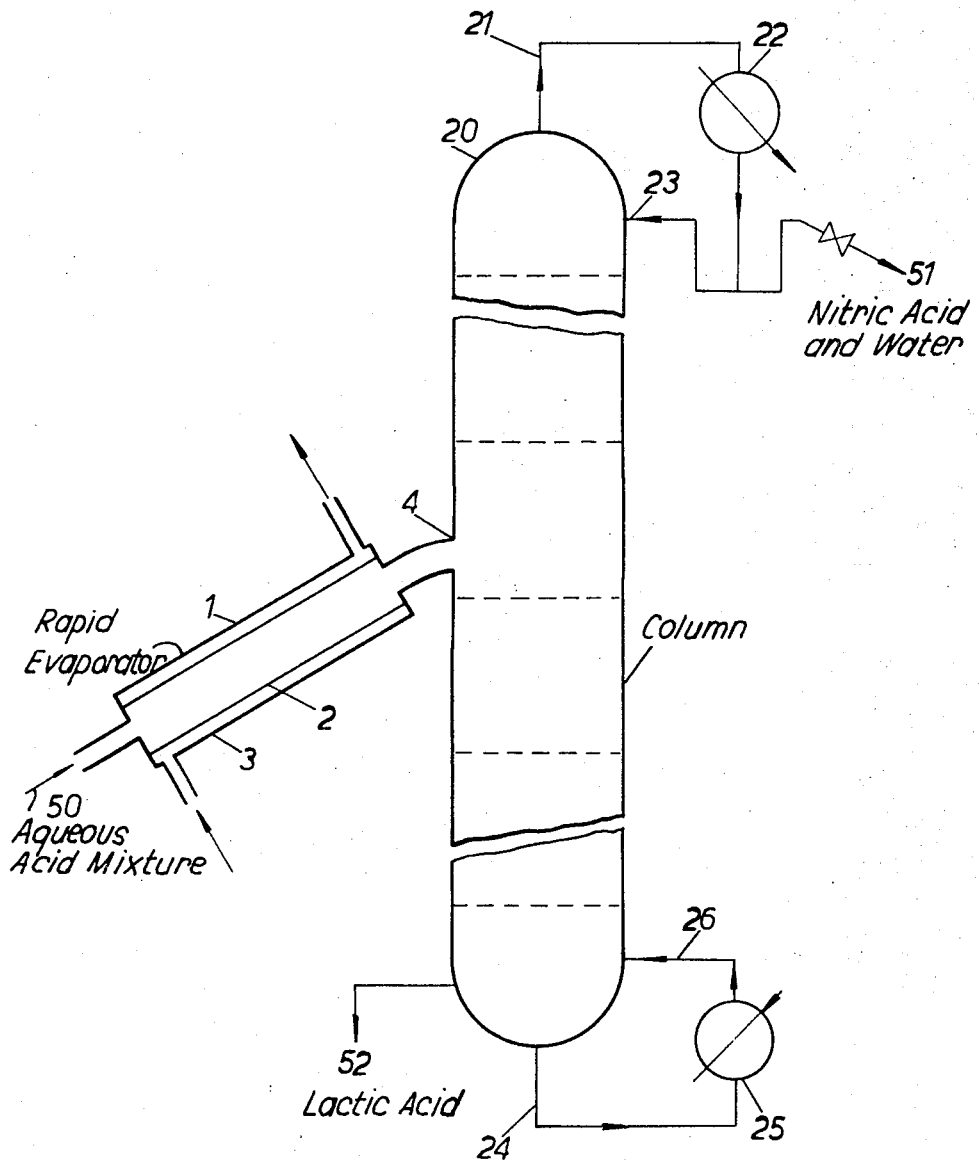

United States Patent
Chaintron

[11] 3,721,610
[45] March 20, 1973

[54] PROCESS FOR THE SEPARATION OF LACTIC ACID FROM WATER AND NITRIC ACID BY RAPID PREEVAPORATION AND DISTILLATION

[75] Inventor: Gerard Chaintron, Lyon, France

[73] Assignee: Rhone-Poulenc S.A., Paris, France

[22] Filed: Nov. 23, 1970

[21] Appl. No.: 91,801

[30] Foreign Application Priority Data

Nov. 24, 1969 France..................................6940393

[52] U.S. Cl. .....................203/77, 203/15, 203/80, 203/88, 203/91, 202/153, 260/535 R
[51] Int. Cl. ..............................................C07c 59/08
[58] Field of Search...............203/80, 77, 88, 91, 15; 202/153, 155; 260/535 R, 533 R

[56] References Cited

UNITED STATES PATENTS

| | | |
|---|---|---|
| 1,594,843 | 8/1926 | Lawrie..............................260/535 R |
| 2,543,001 | 2/1951 | Dean.................................202/153 |
| 2,900,312 | 8/1959 | Gilmore..............................203/2 |
| 1,106,832 | 8/1914 | Obrador.............................202/155 |
| 3,280,091 | 10/1966 | Dance...............................203/88 |
| 2,334,524 | 11/1943 | Wenker.............................260/535 |
| 2,350,370 | 6/1944 | Schopmeyer et al.................260/535 |
| 2,847,464 | 8/1958 | Robertson et al. .................260/533 |

Primary Examiner—Wilbur L. Bascomb, Jr.
Attorney—Stevens, Davis, Miller & Mosher

[57] ABSTRACT

Lactic acid is recovered from aqueous mixtures containing it together with nitric acid, e.g. obtained by hydrolysis of the oxidation product of propylene with nitric acid, by passing the mixture into a rapid evaporator operating at a pressure less than 200 mm. mercury with a residence time less than 5 minutes to give a vaporized phase containing at least 60 percent by weight of the water and nitric acid and less than 40 percent by weight of the lactic acid, passing this vaporized phase together with non-vaporized material directly to a distillation column operating under reduced pressure and recovering the lactic acid as bottom product.

8 Claims, 2 Drawing Figures

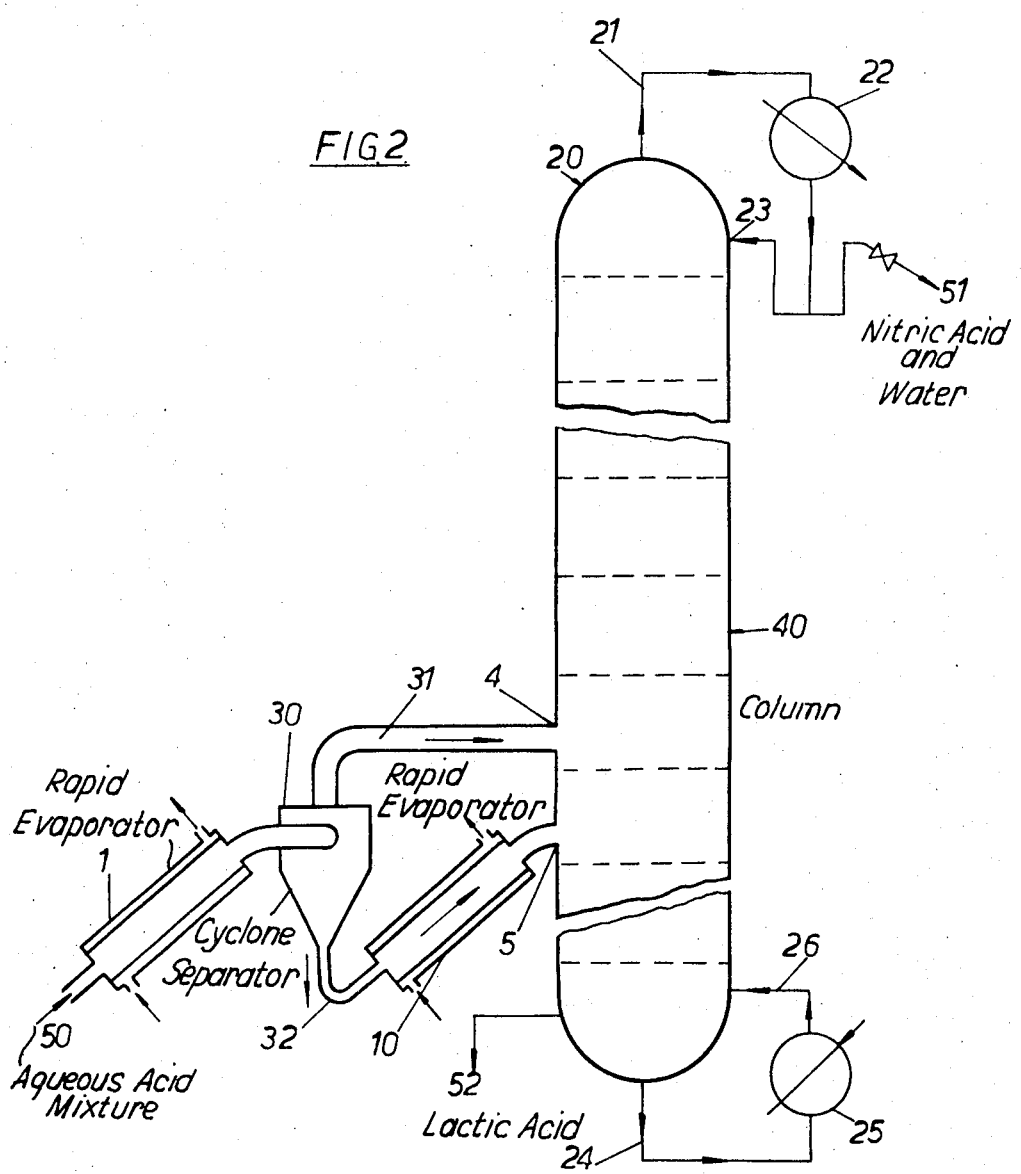

PROCESS FOR THE SEPARATION OF LACTIC ACID FROM WATER AND NITRIC ACID BY RAPID PREEVAPORATION AND DISTILLATION

The present invention relates to a process for recovering lactic acid from a mixture which essentially comprises nitric acid, lactic acid and water.

French Patent Specification No. 1,465,640 and its Additions, Nos. 90,556 and 92,116 and French Patent Specification No. 1,500,619, describe the preparation of lactic acid by oxidation of propylene with nitric acid and/or nitrogen peroxide, optionally in the presence of oxygen, to give an intermediate product consisting principally of α-nitratopropionic acid, which is thereafter subjected to hydrolysis with water, where appropriate in the presence of an acid such as nitric acid. During the reaction, nitric acid is liberated and at the end of the treatment an aqueous solution of lactic acid is obtained which contains nitric acid and possibly other reactants or reaction byproducts in minor amounts.

In order to prepare pure lactic acid, it is necessary to subject this mixture, in solution, to various separation processes.

According to French Patent Specification No. 1,500,619 the nitric acid can be separated off either by means of liquid anion exchangers or by azeotropic distillation with the aid of acetic acid. These two separation processes are unsatisfactory in that they involve the use of a third substance to effect the separation and also processes for the purification or regeneration of this third substance.

A process has now been discovered in accordance with the present invention which permits the separation of lactic acid from aqueous solutions of lactic and acetic acids without the involvement of third substances.

The present invention provides a process for the recovery of lactic acid from a mixture comprising lactic acid, nitric acid and water wherein the mixture is passed into a rapid evaporator operating under reduced pressure, the rate of flow of the mixture into the evaporator and the heating of the evaporator being such that the mixture has a residence time in the evaporator of less than 5 minutes, preferably less than 1 minute, and there is obtained a vapor fraction containing an amount of nitric acid and water which is at least 60 percent, preferably at least 80 percent by weight of the nitric acid and water originally present in the mixture and less than 40 percent and preferably less than 20 percent by weight of the lactic acid originally present in the mixture and thereafter, the vaporized fraction and the non-vaporized fraction are passed directly to a distillation column operating under reduced pressure and distilled so that nitric acid and water issue from the head of the column and lactic acid, which may be partially or completely in the form of lactyllactic acid, issues at the base of the column, the pressure reduction applied to the evaporator and column being such that the pressure in the evaporator is less than 200 mm. and preferably less than 100 mm. mercury.

Lactyllactic acid may be obtained in the present process in accordance with the following equation:

$$2CH_3\text{---}CHOH\text{---}COOH \rightleftarrows CH_3\text{---}CHOH\text{---}COO\text{---}CH(CH_3)\text{---}COOH + H_2O.$$

Since this equilibrium is displaced in one direction or the other depending on the conditions and especially depending on the temperature and the amount of water present (in the case of an aqueous solution of lactic acid), it follows that generally lactic acid, even purified and sold commercially practically always contains varying amounts of lactyllactic acid [R. Eder. et al Helv. Chem. Acta 9 355–64 (1926)].

The mixture of nitric acid, lactic acid and water to which the process of the invention is applied may be one obtained by hydrolysis, in accordance with the known processes, of the products of the oxidation of propylene by $N_2O_4$ and/or $HNO_3$, such as α-nitratopropionic acid. They can thus still contain minor amounts of reactants, of hydrolysis products and/or of oxidation products, of a known or unknown nature.

Various apparatus can be used to carry out the process of the invention but will generally consist of a combination of at least one device which allows a rapid, preferably instantaneous, evaporation, and a distillation column.

A more detailed description of the invention will now be given with reference to FIGS. 1 and 2 of the attached drawings which schematically illustrate, by way of example and without a specific scale, embodiments of the apparatus which may be used.

FIG. 1 illustrates a so-called "instantaneous" evaporator combined with a distillation column, and FIG. 2 illustrates a different embodiment which employs two instantaneous evaporators.

In FIG. 1 instantaneous evaporator 1, which can be of any known type; essentially comprising a tube 2 surrounded by a heating jacket 3, and having aqueous acid entry port 50, is arranged along an inclined or vertical axis, and opens into distillation column 20, at the middle zone thereof 4. Column 20 may be of conventional type provided, on the inside, with a device which allows intimate contact of the rising vapors with the descending liquids; this column can thus be of the plate type or of the packed type. The head of column 20 is provided with an overhead products line 21 leading to condenser 22, the output from which is partially recycled to column 20 through line 23 as reflux liquid and partially removed from the system through outlet 51. The bottom of the column 20 is provided with lactic acid outlet 52 and a boiler 25 with associated lines 24 and 26 leading from and to column 20.

Before carrying out a separation according to the invention, the apparatus is evacuated to a reduced pressure of less than 200 mm of mercury, preferably less than 100 mm of mercury. During operation, the pressure is essentially the same throughout the apparatus, but small differences can nevertheless exist between the instantaneous evaporator 1 and the column 20 because of pressure losses.

Into this apparatus of FIG. 1, subjected to reduced pressure, the mixture of nitric acid, lactic acid and water is introduced at 50; this mixture passes into the tube 2 and is heated by means of a heating fluid which flows through the jacket 3, so as to vaporize an amount of water and nitric acid which is at least 60 vapor, by weight of that originally present and less than 40 percent of the lactic acid during the residence time which is less than 5 minutes. A mixture of vapors and liquid is obtained, which at 4 passes into the middle part of the column: the vapor phase of this mixture essentially consists of water and nitric acid and usually contains a little lactic acid; the liquid phase of the mixture essentially consists of lactic acid and/or lactyllactic acid, but usually contains a little water and nitric acid; these two phases, namely the liquid and the vapor separate in the column, the former passes to the head and the latter to the base of column 20.

At the head of column 20, the vapors reach condenser 22 through line 21. The condensate obtained is partially recycled into column 20 through line 23 and partially removed from the system through outlet 51.

At the base of column 20, a branch circuit consisting of lines 24 and 26 allows boiler 25 to supply to the column the heat required for the distillation; boiler 25 can operate by simple heating; it can also cause total or partial vaporization of the liquid flowing through it. In this case, the boiler can consist of an instantaneous evaporator, which makes it possible, by reducing the residence time of the products in the apparatus, to obtain a lactic acid which is principally in the lactic, and not in the lactyllactic, form.

The lactic acid, possibly in the lactyllactic form, is withdrawn at 52.

FIG. 2 illustrates apparatus comprising a two-stage rapid evaporation system in combination with a distillation column.

The two-stage rapid evaporation system principally comprises two instantaneous evaporators 1 and 10, and a separator 30, preferably of the cyclone type is provided. The output from evaporator 1 passes to separator 30 and the more volatile products separated pass through line 31 to the column 40 at 4. The less volatile products leave separator 30 through line 32 which feeds evaporator 10 and the output from evaporator 10 enters column 40 at 5. Instantaneous evaporators 1 and 10 may be of any known type, for example of the type described in relation to FIG. 1 and for reasons which have again been explained in relation to FIG. 1, these evaporators are preferably arranged along an inclined or vertical axis, with ascending circulation of the fluids flowing through them.

The column 40 only differs from column 20 in FIG. 1 in that it has two feed tubes 4 and 5 in the middle zone in place of a single tube. Tube 4 is arranged closer to the top of column 40 than tube 5, because it feeds the column with mixtures which are richer in water and nitric acid than those supplied by tube 5.

Column 40 like column 20 is provided with overhead products line 21, condenser 22, reflux line 23 and outlet 51 at the head of the column and lactic acid outlet 52, boiler 25 and associated lines 24 and 26 at the bottom of the column.

After evacuating the apparatus of FIG. 2, to provide reduced pressure as described above in relation to the apparatus of FIG. 1, the mixture of nitric acid, lactic acid and water is introduced at 50 into instantaneous evaporator 1. On issuing from this evaporator, the mixture of liquids and vapors passes tangentially into cyclone 30. The vapor phase, consisting principally of water and of nitric acid, escapes through the line 31 and passes into distillation column 40 at 4. The liquid phase, which principally comprises lactic acid, possibly in the lactyllactic form, and usually contains a little water and nitric acid, flows from cyclone 30 through line 32 and to evaporator 10 where it is subjected to a fresh rapid evaporation; the two rapid evaporations carried out in evaporators 1 and 10 being such that, at the end of the two evaporations, at least 60 percent of the water and nitric acid initially present in the mixture, and less than 40 percent of the lactic acid in the mixture, have been vaporized. The residence time of the mixture in the part of the apparatus which precedes the distillation column is in all cases less than 5 minutes. From the outlet of evaporator 10, a mixture of vapors is obtained, usually with a little liquid, which enters the distillation column 40 at 5.

As in the apparatus shown in FIG. 1, after distillation, the water and nitric acid are withdrawn from the system at 51 whilst the lactic acid, which can be wholly or partly in the lactyllactic form, is withdrawn at 52.

Apparatus other than those described above can of course be used without going outside the framework of the present invention.

For example, the rapid evaporation system combined with the distillation column can comprise more than two instantaneous evaporator stages.

As instantaneous evaporator, a rotating evaporator, bundle-type evaporator, plate-type evaporator, or spiral cube-type evaporator, is preferably used.

Steam, or heating fluids in the liquid or vapor phase, can be used as the heating fluid; where appropriate, the wall of the evaporator can be heated directly by electrical resistances or by any other suitable means.

In the case of an apparatus comprising several evaporator stages, the separator or separators arranged between the stages can be of various known types, such as filters, mechanical separators, and the like.

The reflux device at the head of the distillation column, and the boiler at the base of the column, are not essential, but it is nevertheless preferred to use them to improve the efficiency of the column.

The process according to the invention is of particular value because it can easily be operated continuously. It yields a lactic acid which only contains amounts of nitric acid which are generally negligible; depending on the particular conditions employed, and especially on the average residence times of the liquids at the base of the distillation column, the lactic acid obtained can be partially or wholly in the form of lactyllactic acid.

The following Examples are given to illustrate the invention.

EXAMPLE 1

A mixture of nitric acid/lactic acid/water, in respective ratios by weight of 40/15/45, is introduced at 50, at the rate of 10 kg./hour and at a temperature of 20°C., into apparatus of the type shown in FIG. 1. The absolute pressure in the apparatus is 40 mm. of mercury.

The tube 2, which has an internal diameter of 30 mm. and is 100 cm. long, is heated by means of a steam circulation system which provides 3200 kcal/hour (temperature = 100°C.).

The average residence time of the mixture in the instantaneous evaporator is about 0.02 seconds.

The vapors issuing from this evaporator contain 90 percent of the water and nitric acid initially present in the mixture, and 5 percent of the lactic acid originally present.

The column 20 is a column of 16 cm. diameter and 3 m. height, comprising seven bubblecap plates, the feed tube at 4 being located between the second and third plate, counting from the bottom. The reflux ratio, that is to say the ratio by weight of condensate recycled at 23 to the weight of liquid issuing from the column at 51, is 0.2.

At 51, a mixture of water and nitric acid containing about 0.1 percent of lactic acid is withdrawn at the rate of 8.5 kg./hour. At 52 lactic acid, essentially in the lactyllactic form, containing about 0.1 percent of nitric acid and of water, is withdrawn at the rate of 1.5 kg./hour.

EXAMPLE 2

A mixture of nitric acid/lactic acid/water in respective ratios by weight of 40/15/45, is introduced at 50, at the rate of 10 kg./hour and at a temperature of 20°C., into an apparatus of the type shown in FIG. 2. The absolute pressure in the apparatus is 40 mm. of mercury.

The two evaporators 1 and 10 and the column 40 are similar to the corresponding elements described in Example 1. The inlet 4 is located between the second and the third plate of the column, counting from the bottom; the inlet 5 is located between the first and the second plate. The cyclone has a diameter of 16 cm. and a height of 20 cm.

The various fluids, whether liquids or vapors, are circulated as described above with reference to FIG. 2, and in a similar manner *mutatis mutandis* to that described in Example 1. The reflux ratio is 0.2.

The evaporator 1, heated with steam at 100°C., provides 2850 kcal/hour; the vapor issuing from this evaporator contains 80 percent of the water-nitric acid combination originally present in the mixture and 2 percent of the lactic acid.

The evaporator 10, heated with steam at 130°C., provides 700 kcal/hour; the vapor issuing from this evaporator contains 80 percent of the water-nitric acid combination and 13 percent of the lactic acid present in the liquid fed to evaporator 10.

The average residence time of the products between inlet 50 into evaporator 1 and inlet 4 into column 40 is about 0.03 seconds.

The average residence time of the products between inlet 50 and inlet 5 into column 40 is about 10 seconds.

At outlet 51 of the apparatus, a water-nitric acid mixture containing about 0.1 percent of lactic acid is collected at the rate of 8.5 kg./hour.

At outlet 52 of the apparatus, lactic acid, essentially in the lactyllactic form, containing about 0.1 percent of a mixture of water and nitric acid, is collected at the rate of 1.5 kg./hour.

I claim:

1. A process for the recovery of lactic acid from a mixture comprising lactic acid, nitric acid and water wherein the mixture is passed into a rapid evaporator operating under reduced pressure, the rate of flow of the mixture into the evaporator and the heating of the evaporator being such that the mixture has a residence time in the evaporator of less than 5 minutes, and there is obtained a vapor fraction containing an amount of nitric acid and water which is at least 60 percent by weight of the nitric acid and water originally present in the mixture and less than 40 percent by weight of the lactic acid originally present in the mixture and thereafter, the vaporized fraction and the non-vaporized fraction are passed without separation from one another directly to a distillation column operating under reduced pressure and distilled so that nitric acid and water issue from the head of the column and lactic acid, which may be partially or completely in the form of lactyllactic acid, issues at the base of the column, the pressure reduction applied to the evaporator and column being such that the pressure in the evaporator is less than 200 mm. mercury.

2. A process according to claim 1 wherein the residence time of the mixture in the evaporator is less than 1 minute.

3. A process according to claim 1 wherein the pressure in the evaporator is less than 100 mm. mercury.

4. A process according to claim 1 wherein the vaporized product contains at least 80 percent by weight of the nitric acid and water in the mixture and less than 20 percent by weight of the lactic acid in the mixture.

5. A process according to claim 1 wherein the mixture is obtained by hydrolysis of the product obtained by oxidizing propylene with nitric acid and/or nitrogen peroxide.

6. A process according to claim 1 wherein the evaporator is connected to the middle zone of the column and is located along an inclined or vertical axis so that the fluids flowing through it circulate in an ascending manner.

7. A process according to claim 1 wherein the mixture is a mixture of nitric acid, lactic acid and water in a weight ratio of about 40:15:45, and is fed into a rapid evaporator operating at about 100°C. at a pressure of about 40 mm. mercury with a residence time in the evaporator of about 0.02 seconds to give a vaporized fraction containing about 90 percent by weight of the water and nitric acid and 5 percent by weight of the lactic acid present in the original mixture.

8. A process according to claim 1 wherein the mixture is a mixture of nitric acid, lactic acid and water in a weight ratio of about 40:15:45 and is fed into a rapid evaporator operating at about 100°C. at a pressure of about 40 mm mercury to give a vaporized fraction containing about 80 percent by weight of the nitric acid and water and about 2 percent by weight of the lactic acid present in the original mixture which is passed to the distillation column and a non-vaporized fraction which is passed to a second rapid evaporator operating at about 130°C. at a pressure of about 40 mm mercury to give a second vaporized fraction and a non-vaporized fraction, both of which are fed to the distillation column.

* * * * *